Dec. 15, 1925. 1,566,058
J. E. WILLIAMSON
NOZZLE FOR FILTERS
Filed July 28, 1925
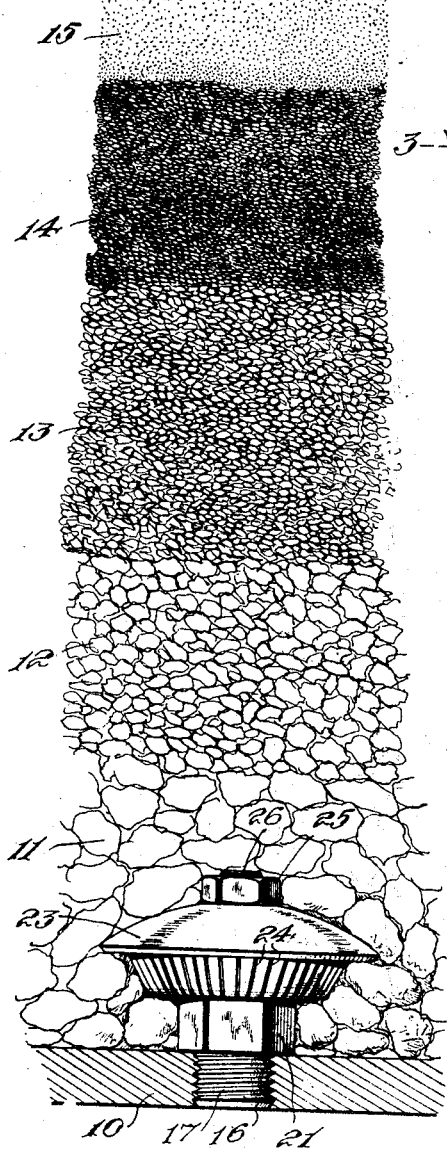
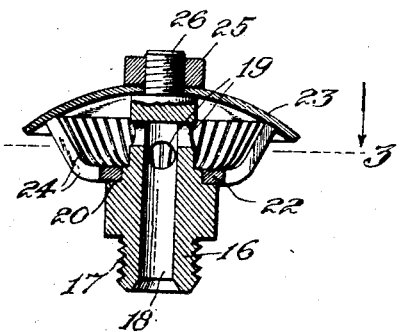
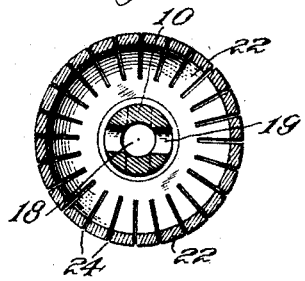
INVENTOR.
James E. Williamson.
BY Wm H Canfield
ATTORNEY Patented Dec. 15, 1925.

1,566,058

UNITED STATES PATENT OFFICE.

JAMES E. WILLIAMSON, OF SOUTH ORANGE, NEW JERSEY.

NOZZLE FOR FILTERS.

Application filed July 28, 1925. Serial No. 46,532.

*To all whom it may concern:*

Be it known that JAMES E. WILLIAMSON, citizen of the United States, residing at South Orange, in the county of Essex and State of New Jersey, has invented certain new and useful Improvements in Nozzles for Filters, of which the following is a specification.

This invention relates to an improved nozzle for use in filters particularly for filters used in the filtering of water.

The invention is designed to provide a nozzle which is constructed so that it will distribute water equally and in such small volume at any one place so that it does not have the effect of washing away the filtering material which is of the coarser kind where the nozzle is located and which, if washed away, will permit the finer gravel and sand to descend and thus clog up the nozzle.

The nozzle is also constructed to allow an economical manufacture and assembling of the parts and also one in which any of the separate parts can be easily replaced if necessary without providing an entirely new nozzle.

The invention is illustrated in the accompanying drawing in which Figure 1 is a section showing a part of the filter but only sufficiently shown to indicate some of the filtering material and part of a pipe, the nozzle being shown in elevation. Figure 2 is a central vertical section of the nozzle shown in Figure 1 and Figure 3 is a section on line 3—3 in Figure 2.

The filter itself is not shown but it is of the usual type with a header and transverse pipes which are in turn provided with nozzles to receive the water after it passes through the filtering material.

In the drawing the transverse pipe is represented by its top wall being shown in section at 10 and the filtering material comprises usually coarse gravel as at 11 and finer gravel in the required number of layers as shown at 12, 13 and 14 and finally sand 15, to the required depth.

In filters of this type the water enters at the top, passes down through the sand and then through the gravel and then passes through the nozzles into the transverse pipes and into the header. Of course, the header and transverse pipe structure is not essential but this is the usual commercial type so that it is used in this specification as typifying the filter.

After awhile the filter becomes dirty and the filtering material needs to be cleaned by setting up a reverse current which reverse current, however, must have the desired wide distribution so as to float upward through the gravel and sand setting up a movement all through the body thereof to cause the grains of sand to rub on one another rather than a violent injection or stream at any one point.

The present nozzle is designed to provide adequate capacity to prevent the filtering material from passing into it and to make the proper distribution of water during the cleaning of the filter. I provide a stem 16 which is provided with a screw-threaded portion 17 at the bottom by means of which it is secured to the pipe 10 or equivalent element, the stem having a passage therethrough including an inlet opening 18 and an outlet 19 usually by boring two holes through the stem at the upper part thereof so as to not weaken it too much and at the same time to provide the capacity.

Part of the stem is enlarged to form a shoulder 20, this enlargement being preferably polygonal to form the faces 21 so that it also serves to receive a wrench whereby the nozzle can be screwed into place. I also provide a cup-like member 22 which is secured on the stem and rests on the shoulder 20 and is held in position by a cover 23 which is usually slightly rounded to provide a dome-like top, the cover extending beyond the top of the cup-like member 22 so that it sheds any material descending on it thus minimizing the possibility of the material so descending from passing into the cup-like member.

The member 22 is provided with a series of slits 24 which in order to provide the proper capacity are arranged closely together but are very thin and narrow so that nothing but the finest of material can pass through thus acting as a strainer. These slits are usually made by cutting into the member 22 from its outer edge radially towards the centre. The top part of the stem is provided with a means for detachably securing the cover in place, in the form shown this comprising a nut 25 screwed onto the screw-threaded end 26 of the stem 16.

The parts are proportioned so that when assembled the cover is fitted down tightly on the stem and the cover engages the outer edge of the cup-like member and the latter rests securely against the shoulder 20 and water cannot pass in or out except through the very narrow slits 24.

It will be evident that when the cleaning step is carried out that water passing out through the slits 24 is distributed in such small streams and thus into only subdivisions that with their divergent directions they do not have sufficient course at any one point to dislodge the heavier filterng material 11 but will provide a well distributed body of water under pressure that ascends through the filtering material to clean the gravel and sand.

This construction permits the use of rolled and stamped metal which is of the same density throughout and has its edges smooth and even to provide good closures between the parts and overcomes the difficulty often present in the cast form of nozzle of the old type in which blow holes and other inequalities occur, thus permitting material to seep in that otherwise would be kept out and in the cleaning out process with water under pressure these slight blow holes soon become enlarged and the nozzle must be replaced by another.

In the present nozzle, if any parts should become bent or by accident have their functional efficiency interfered with, that particular part can be replaced but the other parts can be used in conjunction with the new part.

I claim:

1. A nozzle for filters comprising a stem having inlet and outlet openings, a cup-like member surrounding and supported by the stem, the member having a series of narrow slits extending around its sides, and a cover detachably secured on the top of the stem and extending beyond the cup-like member, the outlet of the stem being situated so as to deliver fluid in the space between the cup-like member and the cover.

2. A nozzle for filters comprising a stem having inlet and outlet openings at its ends, and having a shoulder intermediate its ends, a cup-like member with radial slits on its edge, the member resting on the shoulder, a dome-like cover resting on the top end of the stem and on the top edge of the member and extending beyond the latter, and means for detachably securing the cover in place.

In testimony whereof I affix my signature.

JAMES E. WILLIAMSON.